United States Patent
Hong

(10) Patent No.: US 12,545,824 B2
(45) Date of Patent: Feb. 10, 2026

(54) POLYURETHANE ADHESIVE COMPOSITION AND METHOD FOR PREPARING SAME

(71) Applicants: Hyundai Motor Company, Seoul (KR); Kia Corporation, Seoul (KR)

(72) Inventor: Chae Hwan Hong, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 596 days.

(21) Appl. No.: 17/990,019

(22) Filed: Nov. 18, 2022

(65) Prior Publication Data

US 2024/0002709 A1  Jan. 4, 2024

(30) Foreign Application Priority Data

Jun. 29, 2022  (KR) .................. 10-2022-0079781

(51) Int. Cl.
| | | |
|---|---|---|
| *C09J 175/08* | (2006.01) | |
| *C08G 18/00* | (2006.01) | |
| *C08G 18/10* | (2006.01) | |
| *C08G 18/48* | (2006.01) | |
| *C08G 64/34* | (2006.01) | |

(52) U.S. Cl.
CPC .......... *C09J 175/08* (2013.01); *C08G 18/003* (2013.01); *C08G 18/10* (2013.01); *C08G 18/4845* (2013.01); *C08G 64/34* (2013.01); *C08G 2170/00* (2013.01); *C09J 2475/00* (2013.01)

(58) Field of Classification Search
CPC .... C09J 175/08; C09J 2475/00; C09J 175/06; C09J 175/04; C08G 18/003; C08G 18/10; C08G 64/34; C08G 2170/00; C08G 18/4887; C08G 18/73; C08G 18/44; C08G 18/4883
See application file for complete search history.

(56) References Cited

U.S. PATENT DOCUMENTS

| | | |
|---|---|---|
| 10,513,638 B2 | 12/2019 | Marin Perales et al. |
| 2018/0223030 A1* | 8/2018 | Klesczewski ...... C08G 18/7621 |
| 2018/0334529 A1* | 11/2018 | García Ruiz ...... C08G 65/2603 |
| 2019/0256640 A1 | 8/2019 | Norwig et al. |
| 2020/0255584 A1* | 8/2020 | Achten ................ B33Y 70/00 |

FOREIGN PATENT DOCUMENTS

| | | |
|---|---|---|
| JP | H1160940 A  * | 3/1999 |
| JP | 2013-527281 A | 6/2013 |
| KR | 2018-0015128 A | 2/2018 |
| KR | 2021-0049796 A | 5/2021 |
| WO | 2016-120406 A1 | 8/2016 |

OTHER PUBLICATIONS

JPH1160940A Espacenet Translation (Year: 1999).*

* cited by examiner

*Primary Examiner* — Randy P Gulakowski
*Assistant Examiner* — Virginia L Stonehocker
(74) *Attorney, Agent, or Firm* — Fox Rothschild LLP

(57) ABSTRACT

Disclosed are a polyurethane adhesive composition having excellent adhesive performance and a method of preparing the composition. The polyurethane adhesive composition includes an ether-based compound containing an epoxide functional group a polyether carbonate polyol containing a carbonate bond so as to implement a carbon reduction effect. The polyurethane adhesive composition includes a admixture including (i) a polyether carbonate polyol containing a carbonate bond and (ii) an isocyanate compound, and an ether-based compound containing an epoxide functional group.

18 Claims, No Drawings

POLYURETHANE ADHESIVE COMPOSITION AND METHOD FOR PREPARING SAME

CROSS-REFERENCE TO RELATED APPLICATION

This application claims under 35 U.S.C. § 119(a) the benefit of priority to Korean Patent Application No. 10-2022-0079781 filed on Jun. 29, 2022, the entire contents of which are incorporated herein by reference.

TECHNICAL FIELD

The present disclosure relates to a polyurethane adhesive composition and a method for preparing the same. The polyurethane adhesive composition may provide excellent adhesive performance.

BACKGROUND

Polyurethane adhesives used as adhesives for automobiles have been used to bond substrates to car body structures. Conventional polyurethane adhesives are generally manufactured using petroleum-based polyols.

Recently, interest and regulations regarding the low carbonization of petrochemical materials have been increased in automobile industry. For low carbonization of the petrochemical materials, a method of emitting less carbon dioxide or inserting carbon dioxide as a raw material in the process of synthesizing raw materials and polymers has been reported.

Meanwhile, polyurethane was developed by Otto Bayer of Germany in 1937, has various constituents and has excellent reactivity so that it is widely used in various fields. Polyurethane is a polymer compound having a plurality of urethane bonds (—NHCOO—) produced by the combination of a polyol having two or more alcohol groups (—OH) and a polyisocyanate having two or more isocyanate groups (—NCO) in the molecule.

Since polyurethane has physical properties such as hardness, thermal stability, and adhesive strength which can be controlled depending on the variation of the type or mixing ratio of raw material, it is very important to discover new materials that become constituents and to derive a mixing technology.

Conventionally, a low carbonization synthesis method of polyol and isocyanate, which are the main materials of polyurethane, has not been developed so that a low carbonization method of polyurethane adhesive has not been derived.

Therefore, under the background as described above, a polyol synthesis method in which carbon dioxide is inserted as a raw material into the polyol molecular structure is derived, and the development of a polyurethane adhesive composition capable of reducing carbon using the method is required.

SUMMARY

In preferred aspects, provided are a polyurethane adhesive composition having excellent adhesive performance while implementing a carbon reduction effect, and a method for preparing the same.

The objects of the present disclosure are not limited to the object mentioned above. The objects of the present disclosure will become clearer from the following description, and will be realized by means and combinations thereof described in the claims.

In an aspect, provided is a polyurethane adhesive composition including: a admixture including (i) a polyether carbonate polyol containing a carbonate bond and (ii) an isocyanate compound, and an ether-based compound containing an epoxide functional group.

A term "ether-based compound" as used herein refers to an organic component having a structure including one or more ether group (e.g., R—O—R', wherein each R and R' is independently hydrocarbon, e.g., alkyl, cycloalkyl, or aryl) as of functional group. In certain embodiments, the ether-based compound contains an epoxide group

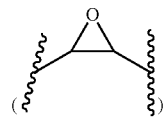 [SMILES: *C1OC1*]

which is reactive to a chemical species, e.g., polyol and/or isocyanate.

A term "isocyanate compound" as sued herein refers to a compound having one or more isocyanate (e.g., —N═C═O) groups, preferably, two or more isocyanate groups. In certain embodiments, the isocyanate compound may have two or more terminal isocyanate group so is represented as O═C═N—R—N═C═O (wherein R is a hydrocarbon, e.g., alkyl, cycloalkyl, or aryl), which is reactive to epoxide and/or polyol.

The polyurethane adhesive composition may include a reaction product obtained from the admixture and the ether-based compound.

The polyether carbonate polyol may include a copolymer obtained from polymerizing a polyether polyol, carbon dioxide ($CO_2$), and propylene oxide (PO).

The polyether carbonate polyol may suitably include an amount of about 5 to 15% by weight of the carbonate bond based on the total weight thereof.

The polyether carbonate polyol may have a hydroxyl value of about 40 to 80 mg KOH/g and a weight average molecular weight ($M_w$) of about 1,500 to 2,500 g/mol.

The polyether carbonate polyol and the isocyanate compound may have a molar ratio of about 1:1.5 to 2.5.

The isocyanate compound may have a weight average molecular weight ($M_w$) of about 100 to 500 g/mol.

The isocyanate compound may include hexamethylene diisocyanate (HMDI).

The polyether carbonate polyol, isocyanate, and the ether-based compound may have a molar ratio of about 1:2:3.4 to 3.6.

A molar ratio of the polyether carbonate polyol and the ether-based compound may be about 1:3.4 to 3.6.

The ether-based compound may include one or more selected from the group consisting of ethylene glycol diglycidyl ether, 1,4-butanediol diglycidyl ether, propylene glycol diglycidyl ether, 1,6-hexanediol diglycidyl ether, diethylene glycol diglycidyl ether, triethylene glycol diglycidyl ether, dipropylene glycol diglycidyl ether, tripropylene glycol diglycidyl ether, glycerol triglycidyl ether, polypropylene glycol diglycidyl ether, and polyethylene glycol diglycidyl ether.

In an aspect, provided is a method for preparing a polyurethane adhesive composition. The method includes steps of: preparing an admixture including a polyether carbonate polyol containing a carbonate bond and an isocyanate compound, and obtaining a reaction product by reacting an ether-based compound containing an epoxide functional group and the admixture.

The polyether carbonate polyol may include a copolymer obtained from polymerizing a polyether polyol, carbon dioxide ($CO_2$), and propylene oxide (PO).

The polyether carbonate polyol may include an amount of about 5 to 15% by weight of the carbonate bond based on the total weight thereof, and have a hydroxyl value of about 40 to 80 mg KOH/g, and a weight average molecular weight ($M_w$) of about 1,500 to 2,500 g/mol.

The isocyanate compound may have a weight average molecular weight ($M_w$) of about 100 to 500 g/mol and include hexamethylene diisocyanate (HMDI).

The step of preparing the admixture may include mixing the polyether carbonate polyol and the isocyanate compound at a molar ratio of about 1:1.5 to 2.5.

The admixture may be prepared at a temperature of about 20 to 40° C.

The ether-based compound may include one or more selected from the group consisting of ethylene glycol diglycidyl ether, 1,4-butanediol diglycidyl ether, propylene glycol diglycidyl ether, 1,6-hexanediol diglycidyl ether, diethylene glycol diglycidyl ether, triethylene glycol diglycidyl ether, dipropylene glycol diglycidyl ether, tripropylene glycol diglycidyl ether, glycerol triglycidyl ether, polypropylene glycol diglycidyl ether, and polyethylene glycol diglycidyl ether.

The reaction product may include the polyether carbonate polyol and the ether-based compound at a molar ratio of about 1:3.4 to 3.6.

The reaction product may be obtained from a reaction performed at a temperature of about to 90° C.

Also provided is a vehicle part including the polyurethane adhesive composition as described herein. Further, provided is a vehicle including the vehicle part as described herein. The polyurethane adhesive composition according to various exemplary embodiments of the present disclosure can have excellent adhesive performance by mixing and reacting a polyether polyol containing a carbonate bond, the isocyanate compound, and an ether-based compound containing an epoxide functional group at an appropriate molar ratio.

Further, the method for preparing a polyurethane adhesive composition according to various exemplary embodiments of the present disclosure includes using a polyether carbonate polyol that can implement a carbon reduction effect, thereby enabling carbon dioxide to be reduced compared to a polyurethane adhesive using a petroleum-based polyether polyol when preparing the polyurethane adhesive composition.

Other aspects of the invention are disclosed infra.

DETAILED DESCRIPTION

The above objects, other objects, features and advantages of the present disclosure will be easily understood through the following preferred embodiments related to the accompanying drawings. However, the present disclosure is not limited to the embodiments described herein and may be embodied in other forms. Rather, the embodiments introduced herein are provided so that the disclosed content may become thorough and complete, and the spirit of the present disclosure may be sufficiently conveyed to those skilled in the art.

In the present specification, terms such as "comprise", "have", etc. are intended to designate that a feature, number, step, operation, component, part, or a combination thereof described in the specification exists, but it should be understood that the terms do not preclude the possibility of the existence or addition of one or more other features, numbers, steps, operations, components, parts, or combinations thereof.

Unless otherwise specified, since all numbers, values, and/or expressions expressing quantities of components, reaction conditions, polymer compositions and formulations used in the present specification are approximate values reflecting various uncertainties of the measurement that arise in obtaining these values, among others, in which these numbers are essentially different, they should be understood as being modified by the term "about" in all cases.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Further, when a numerical range is disclosed in this description, such a range is continuous, and includes all values from a minimum value of such a range to the maximum value including a maximum value, unless otherwise indicated. Furthermore, when such a range refers to an integer, all integers including from a minimum value to the maximum value including a maximum value are included, unless otherwise indicated. In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Compositions

In an aspect, the disclosure provides a polyurethane adhesive composition that can be obtained by reacting a admixture including (i) a polyether carbonate polyol containing a carbonate bond and (ii) an isocyanate compound with an ether-based compound containing an epoxide functional group.

Each component constituting the polyurethane adhesive composition according to the present disclosure will be described in more detail as follows.

(A) Polyether Carbonate Polyol

The polyether carbonate polyol may be obtained from polymerization of a polyether polyol, carbon dioxide, and propylene oxide.

The polyether carbonate polyol may be prepared by copolymerizing a polyether polyol, carbon dioxide, and propylene oxide as shown in Chemical Reaction Formula 1 below.

The polyether carbonate polyol may be obtained by copolymerizing a polyether polyol, carbon dioxide, and propylene oxide in the presence of a catalyst.

The type of catalyst is not particularly limited, and may include a double metal cyanide catalyst and the like.

The polyether polyol may include one or more selected from the group consisting of a polypropylene glycol block copolymer, a polyethylene glycol block copolymer, a poly-

[Chemical Reaction Formula 1]

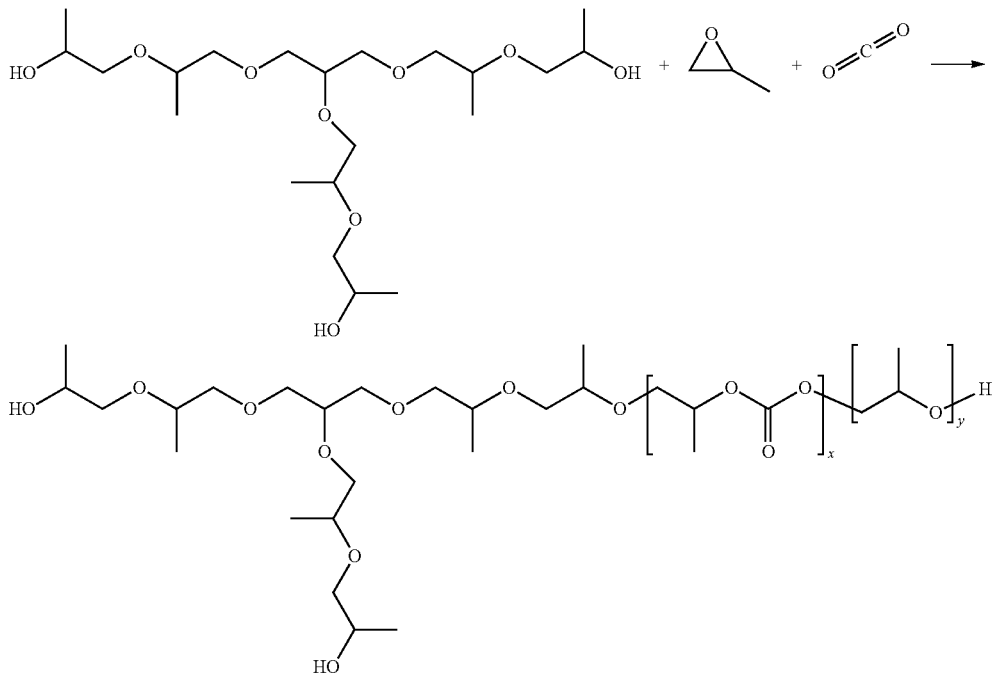

In Chemical Reaction Formula 1, x and y may be appropriately adjusted according to the desired weight average molecular weight of the polyether carbonate polyol. For example, x and y may be numbers belonging to 1 to 100 respectively.

In Chemical Reaction Formula 1 above, a portion of a petroleum-based raw material such as polypropylene oxide or the like is replaced with carbon dioxide ($CO_2$) when synthesizing a polyether carbonate polyol, thereby reducing the cost of feedstock and reducing carbon emission compared to conventional methods.

Since the polyether carbonate polyol uses carbon dioxide as a raw material, it may contain a carbonate bond. The carbonate bond means a structure represented by —O—R—O—OO— (where R is any hydrocarbon, e.g., alkyl, cycloalkyl, or aryl, or particularly an alkyl group having 1 to 3 carbon atoms), and may mean, for example, a repeating unit at the right end of the polyether carbonate polyol of Chemical Reaction Formula 1 above.

The polyether carbonate polyol may contain an amount of about 5% by weight to 15% by weight of the carbonate bond based on the total weight thereof. When the content of the carbonate bond is less than about 5% by weight, the effect of reducing feedstock cost and carbon emission may be insignificant, and when it is greater than about 15% by weight, the intrinsic properties of the polyether carbonate polyol may deteriorate.

tetramethylene ether glycol block copolymer, a block copolymer of ethylene oxide and propylene oxide, a butylene oxide polymer, and a hyperbranched polyglycidol.

The reaction amounts of the polyether polyol, carbon dioxide, and propylene oxide are not particularly limited, and may be appropriately adjusted depending on the desired weight average molecular weight, stoichiometry, and the like of the polyether polyol, carbon dioxide, and propylene oxide.

The polyether carbonate polyol may have a hydroxyl value of about 40 to 80 mg KOH/g and a weight average molecular weight ($M_w$) of of about 1,500 to 2,500 g/mol. Particularly, a polyether carbonate polyol having a weight average molecular weight ($M_w$) of about 2,000 g/mol may be preferably used.

When the hydroxyl value and the weight average molecular weight ($M_w$) of the polyether carbonate polyol are out of the above ranges, a problem of lowering adhesive performance in a final adhesive may occur.

(B) Isocyanate Compound

Isocyanate compound is an essential component added in the manufacture of polyurethane, and serves to cause a chemical reaction with a polyol.

The isocyanate compound may serve to make uniform distribution of a hard segment and a soft segment in the polyurethane structure through the chemical reaction of the polyol.

The isocyanate compound may have a weight average molecular weight ($M_w$) of 100 to 500 g/mol. Preferably, the isocyanate compound having a weight average molecular weight ($M_w$) of 168 g/mol may be used in the present disclosure.

When the weight average molecular weight ($M_w$) of the isocyanate compound is out of the above range, a problem of lowering adhesive performance in the final adhesive may occur, or a problem of failing to implement appropriate viscoelastic properties required as an adhesive may occur.

The isocyanate compound may be hexamethylene diisocyanate (HMDI) represented by Chemical Formula 1 below.

[Chemical Formula 1]

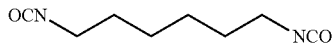

The polyether carbonate polyol and isocyanate may be mixed at a molar ratio of 1:1.5 to 2.5.

When the polyether carbonate polyol and isocyanate have a molar ratio of 1:less than about 1.5, a problem of lowering adhesive performance of the final material may occur. Conversely, when the polyether carbonate polyol and isocyanate have a molar ratio of 1:greater than about 2.5, there may be a problem in that appropriate viscoelastic properties required as an adhesive cannot be realized due to excessive chemical reaction and hardness enhancement.

(C) Ether-Based Compound

The ether-based compound may preferably include a compound containing an epoxide.

Since the ether-based compound serves as a reactive diluent for lowering the viscosity by causing a chemical reaction with the polyether carbonate polyol in the polyurethane adhesive composition, flexibility may be imparted in the polyurethane adhesive composition according to the present disclosure.

The ether-based compound may include one or more selected from the group consisting of ethylene glycol diglycidyl ether, 1,4-butanediol diglycidyl ether, propylene glycol diglycidyl ether, 1,6-hexanediol diglycidyl ether, diethylene glycol diglycidyl ether, triethylene glycol diglycidyl ether, dipropylene glycol diglycidyl ether, tripropylene glycol diglycidyl ether, glycerol triglycidyl ether, polypropylene glycol diglycidyl ether, polyethylene glycol diglycidyl ether, and combinations thereof. Preferably, the ether-based compound may include 1,6-hexanediol diglycidyl ether.

In the conventional ether-based compound, when the contained diol material comes into contact with isocyanate, a urethane chemical reaction occurs due to injected heat, a small amount of moisture, and the like. For example, a polyurethane chemical structure is formed by the principle of van der Waals force, and the polyurethane material itself has adhesive performance.

Meanwhile, since the ether-based compound containing an epoxide according to certain embodiments of the present disclosure has an appropriate carbon number of 4 to 10, it has appropriate fluidity and viscosity. In addition, since the present disclosure has an epoxide at the end of the ether-based compound, the adhesive performance can be further improved by the epoxy monomer.

The polyether carbonate polyol and the ether-based compound may have a molar ratio of about 1:3.4 to 3.6.

In the polyurethane adhesive composition, when the polyether carbonate polyol and the ether-based compound have a molar ratio of 1:less than about 3.4, the structure of the final material is unstable, and thus a problem of lowering the mechanical properties and durability may occur. Conversely, when the polyether carbonate polyol and the ether-based compound have a molar ratio of 1:greater than about 3.6, partial physical property deviations due to excessive crosslinking occur, and thus a problem of reducing uniform performance expression as an adhesive may occur.

Accordingly, the polyurethane adhesive composition may have a mixing molar ratio of the polyether carbonate polyol, isocyanate, and the ether-based compound of about 1:2:3.4 to 3.6.

(D) Additive

The additive may impart various functionalities to the polyurethane adhesive composition, and the additive may include one known without any particular limitation in the range that does not impair the effects of the present disclosure.

In certain embodiments, the additive preferably may improve the low flame retardancy in the polyurethane adhesive.

The additive may include one or more selected from the group consisting of halogen-based flame retardants, phosphorus-based flame retardants, and inorganic flame retardants.

Methods of Preparation

In an aspect, the disclosure provides a method for preparing such a polyurethane adhesive composition according to the present disclosure comprises the steps of preparing a admixture including (i) a polyether carbonate polyol containing a carbonate bond and (ii) an isocyanate compound, e.g., by mixing, and obtaining a reaction product by reacting an ether-based compound with the admixture.

Each step of the method for preparing the polyurethane adhesive composition according to the present disclosure will be described in detail as follows.

In the step of preparing the admixture, the isocyanate compound and the polyether carbonate polyol containing a carbonate bond may be mixed. The polyether carbonate polyol may include one prepared by copolymerizing a polyether polyol, carbon dioxide, and propylene oxide. In addition, isocyanate may include hexamethylene diisocyanate.

Further, the admixture may be prepared at a temperature of 20 to 40° C. ro provide an excellent dispersibility effect.

At this time, in the step of preparing the admixture, the polyether carbonate polyol and isocyanate may be mixed at a molar ratio of about 1:1.5 to 2.5 to prepare a admixture.

In the step of preparing the admixture, when the polyether carbonate polyol and isocyanate have a molar ratio of about 1:1.5 or less, a problem of lowering the adhesive performance of the final material may occur. Conversely, if the polyether carbonate polyol and isocyanate have a molar ratio of about 1:2.5 or greater, there may be a problem in that appropriate viscoelastic properties required as an adhesive due to excessive chemical reaction and hardness enhancement are failed to be realized.

The reaction product may be obtained or synthesized by reacting (e.g., mixing) the admixture and an ether-based compound containing an epoxide functional group. Here, 1,6-hexanediol diglycidyl ether may be used as the ether-based compound.

The reaction product may be obtained from a reaction at a temperature of about 80 to ° C. When the synthesis temperature is less than about 80° C., the reaction does not occur well, and when the synthesis temperature is greater than about 90° C., the reaction rate is too fast, and thus there may be a problem in that uniform mixing of the internal density is not made.

Further, in the step of obtaining the reaction product, the polyether carbonate polyol and the ether-based compound may be mixed at a molar ratio of about 1:3.4 to 3.6 to prepare a polyurethane adhesive.

In the step of obtaining the product, when the polyether carbonate polyol and the ether-based compound have a molar ratio of 1:less than about 3.4, the structure of the final material is unstable, and thus a problem of lowering the mechanical properties and durability may occur. Conversely, when the polyether carbonate polyol and the ether-based compound have a molar ratio of 1:greater than about 3.6, partial physical property deviations occur due to excessive crosslinking, and thus a problem of reducing uniform performance expression as an adhesive may occur.

Finally, the polyurethane adhesive composition prepared by the preparation method according to the present disclosure may have a density of about 30 to 140 kg/m 3.

Meanwhile, the polyurethane adhesive composition is not limited in its field of use, but may be used as an adhesive material for automobile part materials. Particularly, it exhibits a high level of adhesive performance even for adhesion of various materials and different materials applied in automobiles, and thus can be usefully applied industrially.

EXAMPLE

Hereinafter, the present disclosure will be described in more detail through specific Examples. The following Examples are only examples to help the understanding of the present disclosure, and the scope of the present disclosure is not limited thereto.

First, Examples 1 to 3 were prepared in the following manner by applying the molar ratios of the components shown in Table 1 below.

Examples 1 to 3

First, a polyether carbonate polyol and isocyanate were mixed under the conditions of 1 atm and at a temperature of 30 to 32° C.

Subsequently, an ether-based compound containing an epoxide functional group was mixed with the mixtures, and then the temperature was raised to 80 to 90° C. At this time, a polyurethane adhesive composition as a final product was prepared by performing stirring at 500 to 700 rpm using a stirrer.

TABLE 1

| Classification (Unit: molar ratio) | Example 1 | Example 2 | Example 3 |
|---|---|---|---|
| Polyether carbonate polyol | 1 | 1 | 1 |
| Isocyanate | 2 | 2 | 2 |
| Ether-based compound | 3.5 | 3.4 | 3.6 |

1. Polyether carbonate polyol: It synthesizes itself a compound represented by Chemical Formula 2 below. x and y in Chemical Formula 2 are appropriately adjusted according to the weight average molecular weight. It contains a carbonate bond in an amount of 5 to 15% by weight, and has a weight average molecular weight ($M_w$) of 2,000 g/mol and a hydroxyl value of 40 to 80 mg KOH/g.

TABLE 1-continued

| Classification (Unit: molar ratio) | Example 1 | Example 2 | Example 3 |
|---|---|---|---|

2. Isocyanate: hexamethylene diisocyanate (HMDI) having a weight average molecular weight (Mw) of 168 g/mol, a product from Sigma-Aldrich
3. Ether-based compound: 1,6-Hexanediol diglycidyl ether, a product from Sigma-Aldrich

[Chemical Formula 2]

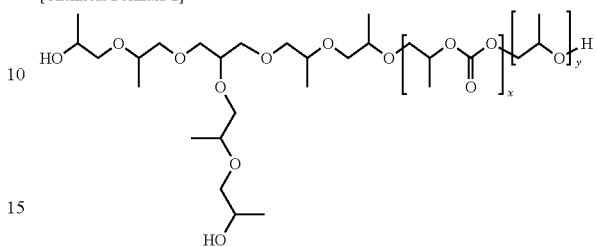

Subsequently, Comparative Examples 1 to 3 were prepared in the following manner by applying the molar ratios of the components shown in Table 2 below.

Comparative Examples 1 to 3

Polyurethane adhesive compositions were prepared in the same manner as in Examples 1 to 3 above except that a petroleum-based polyether polyol was used instead of a polyether carbonate polyol containing a carbonate bond.

TABLE 2

| Classification (Unit: molar ratio) | Example 1 | Example 2 | Example 3 |
|---|---|---|---|
| Petroleum-based polyether polyol | 1 | 1 | 1 |
| Isocyanate | 2 | 2 | 2 |
| Ether-based compound | 3.5 | 3.4 | 3.6 |

1. Petroleum-based polyether polyol: a product from KPX Chemical (*carbonate functional group content: 0% by weight)
2. Isocyanate: hexamethylene diisocyanate (HMDI) having a weight average molecular weight ($M_w$) of 168 g/mol, a product from Sigma-Aldrich
3. Ether-based compound: 1,6-Hexanediol diglycidyl ether, a product from Sigma-Aldrich Experimental Example Physical properties of the polyurethane adhesive compositions according to the Examples and the Comparative Examples were measured by the method as described below for each specimen, and the results are shown in Tables 3 and 4 below.

Evaluation Method (1) Adhesion shear test method:

Two specimens were prepared each with a steel specimen size of 100 mm×25 mm×2 mm.

Subsequently, the two specimens were disposed to give rise to an overlapping area (25 mmX 12.5 mm).

Next, the polyurethane adhesive prepared in the present disclosure was applied to the overlapping area and held at a temperature of 110° C. for 30 minutes, and then stayed in an environment with a relative humidity of 50% for 7 days.

Finally, the adhesive shear strengths were measured under the condition of a head speed of 5 mm/min of a universal tensile tester (ASTM D1002).

TABLE 3

| Classification | Adhesive shear bonding strength test (MPa) |
|---|---|
| Example 1 | 22.2 |
| Example 2 | 22.2 |
| Example 3 | 22.2 |

TABLE 4

| Classification | Adhesive shear bonding strength test (MPa) |
|---|---|
| Comparative Example 1 | 18.2 |
| Comparative Example 2 | 17.6 |
| Comparative Example 3 | 18.5 |

As shown in Table 3, a bonding strength of 22.2 MPa was measured in steel respectively in Examples 1 to 3 using the polyether carbonate polyol containing a carbonate bond so that it could be found that a high level of adhesive performance was expressed. Therefore, the polyurethane adhesive composition according to an exemplarye embodiment of the present disclosure may be used in an appropriate amount of each of the components so that it can have excellent quality.

Meanwhile, as shown in Table 4, bonding strengths of 18.2 MPa, 17.6 MPa, and 18.5 MPa were measured from steel respectively in Comparative Examples 1 to 3 in which a polyol containing a carbonate bond was not used. Thus, Comparative Examples using the petroleum-based polyether polyol expressed a remarkably less adhesive performance compared to the bonding strengths of the Examples according to the exemplary embodiment of the present disclosure.

Therefore, the polyurethane adhesive composition according to various exemplary embodiments of the present disclosure may have superior adhesive performance compared to a petroleum-based polyurethane adhesive composition by mixing and reacting a mixture in which a polyether carbonate polyol containing a carbonate bond and isocyanate are mixed at an appropriate molar ratio with an ether-based compound containing an epoxide functional group at an appropriate molar ratio.

Hereinabove, although the embodiments of the present disclosure have been described, those of ordinary skill in the art to which the present disclosure pertains will be able to understand that the present disclosure may be embodied in other specific forms without changing the technical spirit or essential features thereof. Therefore, it should be understood that the embodiments described above are illustrative in all respects and not restrictive.

What is claimed is:

1. A polyurethane adhesive composition comprising:
   an admixture comprising (i) a polyether carbonate polyol comprising a carbonate bond and (ii) an isocyanate compound; and
   an ether-based compound comprising an epoxide functional group,
   wherein a molar ratio of the polyether carbonate polyol to the other-based compound is about 1:3.4 to 3.6.

2. The polyurethane adhesive composition of claim 1, wherein the polyurethane adhesive composition comprises a reaction product of the admixture and the ether-based compound.

3. The polyurethane adhesive composition of claim 1, wherein the polyether carbonate polyol comprises a copolymer obtained from polymerizing a polyether polyol, carbon dioxide ($CO_2$), and propylene oxide (PO).

4. The polyurethane adhesive composition of claim 1, wherein the polyether carbonate polyol comprises an amount of about 5 to 15% by weight of the carbonate bond based on the total weight of the polyether carbonate polyol.

5. The polyurethane adhesive composition of claim 1, wherein the polyether carbonate polyol has a hydroxyl value of about 40 to 80 mg KOH/g and a weight average molecular weight ($M_w$) of about 1,500 to 2,500 g/mol.

6. The polyurethane adhesive composition of claim 1, wherein a molar ratio of the polyether carbonate polyol and the isocyanate compound is about 1:1.5 to 2.5.

7. The polyurethane adhesive composition of claim 1, wherein the isocyanate compound has a weight average molecular weight ($M_w$) of about 100 to 500 g/mol.

8. The polyurethane adhesive composition of claim 1, wherein the isocyanate compound comprises hexamethylene diisocyanate (HMDI).

9. The polyurethane adhesive composition of claim 1, wherein a molar ratio of the polyether carbonate polyol, the isocyanate compound, and the ether-based compound is about 1:2:3.4 to 3.6.

10. The polyurethane adhesive composition of claim 1, wherein the ether-based compound is one or more selected from the group consisting of ethylene glycol diglycidyl ether, 1,4-butanediol diglycidyl ether, propylene glycol diglycidyl ether, 1,6-hexanediol diglycidyl ether, diethylene glycol diglycidyl ether, triethylene glycol diglycidyl ether, dipropylene glycol diglycidyl ether, tripropylene glycol diglycidyl ether, glycerol triglycidyl ether, polypropylene glycol diglycidyl ether, and polyethylene glycol diglycidyl ether.

11. A method for preparing a polyurethane adhesive composition comprising:
    preparing an admixture comprising (i) a polyether carbonate polyol comprising a carbonate bond and (ii) an isocyanate compound; and
    obtaining a reaction product by reacting an ether-based compound comprising an epoxide functional group and the admixture,
    wherein a molar ratio of the polyether carbonate polyol to the ether-based compound is about 1:3.4 to 3.6.

12. The method of claim 11, wherein the polyether carbonate polyol comprises a copolymer obtained from polymerizing a polyether polyol, carbon dioxide ($CO_2$), and propylene oxide (PO).

13. The method of claim 11, wherein the polyether carbonate polyol comprises an amount of about 5 to 15% by weight of the carbonate bond based on the total weight or the polyether carbonate polyol, and has a hydroxyl value of about 40 to 80 mg KOH/g, and a weight average molecular weight ($M_w$) of about 1,500 to 2,500 g/mol.

14. The method of claim 11, wherein the isocyanate compound has a weight average molecular weight ($M_w$) of about 100 to 500 g/mol and comprises hexamethylene diisocyanate (HMDI).

15. The method of claim 11, wherein the admixture comprises the polyether carbonate polyol and the isocyanate compound at a molar ratio of about 1:1.5 to 2.5.

16. The method of claim 11, wherein the admixture is prepared at a temperature of about 20 to 40° C.

17. The method of claim 11, wherein the ether-based compound is one ore more selected from the group consisting of ethylene glycol diglycidyl ether, 1,4-butanediol diglycidyl ether, propylene glycol diglycidyl ether, 1,6-hexanediol diglycidyl ether, diethylene glycol diglycidyl ether, triethylene glycol diglycidyl ether, dipropylene glycol diglycidyl ether, tripropylene glycol diglycidyl ether, glycerol triglycidyl ether, polypropylene glycol diglycidyl ether, and polyethylene glycol diglycidyl ether.

18. The method of claim 11, wherein the reaction product is obtained from a reaction performed at a temperature of about 80 to 90° C.

* * * * *